United States Patent [19]
Khinkis

[11] Patent Number: 4,909,727
[45] Date of Patent: * Mar. 20, 1990

[54] OXYGEN ENRICHED CONTINUOUS COMBUSTION IN A REGENERATIVE FURANCE

[75] Inventor: Mark J. Khinkis, Morton Grove, Ill.

[73] Assignee: Combustion Tec, Inc., Orlando, Fla.

[*] Notice: The portion of the term of this patent subsequent to Aug. 2, 2005 has been disclaimed.

[21] Appl. No.: 159,219

[22] Filed: Feb. 23, 1988

Related U.S. Application Data

[63] Continuation-in-part of Ser. No. 21,719, Mar. 4, 1987, Pat. No. 4,761,132.

[51] Int. Cl.$^4$ .............................................. F23M 3/04
[52] U.S. Cl. ..................................... 431/10; 432/181; 431/12; 431/351
[58] Field of Search .............. 432/181, 182; 431/10.4, 431/12.11, 175, 351, 174, 179

[56] References Cited

U.S. PATENT DOCUMENTS

| | | | |
|---|---|---|---|
| 1,279,697 | 9/1918 | Hook | 432/181 |
| 1,739,973 | 12/1929 | Mambourg | 432/181 |
| 1,925,941 | 9/1933 | Simpson | 432/181 |
| 3,656,878 | 4/1972 | Wright | 431/10 |
| 3,837,788 | 9/1974 | Craig et al. | 431/351 |
| 3,914,091 | 10/1975 | Yamagishi et al. | 431/10 |
| 4,054,407 | 10/1977 | Carrubba et al. | 431/10 |
| 4,375,235 | 3/1983 | Tsai | 432/181 |
| 4,403,941 | 9/1983 | Okiura et al. | 431/10 |
| 4,405,587 | 9/1983 | McGill et al. | 431/10 |
| 4,427,362 | 1/1984 | Dykema | 431/4 |
| 4,488,866 | 12/1984 | Schirmer et al. | 431/4 |
| 4,496,316 | 1/1985 | Tsai | 432/181 |
| 4,505,666 | 3/1985 | Martin et al. | 431/10 |
| 4,666,403 | 5/1987 | Smith | 432/181 |
| 4,761,132 | 8/1988 | Khinkis | 431/10 |

*Primary Examiner*—Henry C. Yuen
*Attorney, Agent, or Firm*—Thomas W. Speckman; Douglas H. Pauley

[57] ABSTRACT

A process and apparatus for oxygen-rich combustion wherein a first portion of about 5 to about 40 percent of the total fuel to be cracked and combusted is introduced to a cracking chamber where it is combusted and cracked at a temperature below about 2200° F. to produce a cracked products mixture. Oxygen-rich gas of greater than about 30 volume percent oxygen is introduced to the cracking chamber in about 5 to about 50 percent of the stoichiometric requirement for complete combustion of the first portion of fuel introduced to that chamber. Cracked products mixture, a second remaining portion of fresh fuel and oxidizer having sufficient oxygen for substantially complete combustion of the combustible portion of the cracked porducts mixture and the fresh fuel are introduced to a combustion chamber wherein the combustible portion of the cracked products mixture and the fresh fuel are combusted. The process and apparatus provide continuous operation of a fuel cracking chamber when used with regenerative furnaces, such as in the glass making industry.

20 Claims, 2 Drawing Sheets

OXYGEN ENRICHED CONTINUOUS COMBUSTION IN A REGENERATIVE FURANCE

CROSS REFERENCE TO RELATED APPLICATION

This application is a continuation-in-part of copending application, Ser. No. 021,719, filed Mar. 4, 1987 now U.S. Pat. No. 4,761,132.

BACKGROUND OF THE INVENTION

1. Field of the Invention

This invention relates to a process and apparatus for oxygen enriched fossil and synthetic fuel combustion generating controllable, highly luminous, high temperature and high kinetic energy flame. The process and apparatus of this invention provides increased heat transfer to the furnace load, enhanced furnace specific production rate, improved furnace thermal efficiency and reduction in emission of nitrogen oxides. The process and apparatus of this invention provides continuous operation of a fuel cracking chamber when used with regenerative furnaces, such as in the glass making industry.

2. Description of the Prior Art

There have been a number of attempts by a wide variety of techniques to provide combustion of hydrocarbon fuels in a manner to provide improved furnace productivity and increased furnace efficiency, while reducing nitrogen oxides emitted from the furnace. Methods for using oxygen in combustion have been recognized as: addition of oxygen to combustion air; addition of oxygen separately to the combustion zone, as by a lance; and use of a oxygen/fuel burner.

A number of U.S. patents teach staged combustion, principally to obtain lower $NO_x$ emissions. U.S. Pat. No. 4,427,362 teaches a two stage combustion process wherein all of the fuel is mixed with oxygen or oxygen enriched air to provide 45 to 75 percent of the stoichiometric oxygen for combustion and combusted in a first zone with the combustion products being maintained at higher than 2858° F. The combustion products of the first combustion zone are passed to a second combustion zone with 100 to 120 percent stoichiometric air added and combusted at about 2426° to about 3146° F. This patent teaches that the soot and char from the first combustion zone enhances the $NO_x$ reduction rate. U.S. Pat. No. 3,656,878 teaches a high luminosity flame burner wherein all of the combustion air and a portion of hydrocarbon fuel is introduced to a first combustion zone where partial combustion in a diffusion flame produces solid soot particles. It is taught that a free radical promotor may be used and that oxygen is a soot promotor, the free radical promoting effect of oxygen predominating at low concentrations results in increased soot formation. The products of the first combustion zone and fresh hydrocarbon fuel are introduced to the second combustion zone wherein combustion is carried out with a high luminosity flame enhanced by the presence of the soot. U.S. Pat. No. 3,837,788 teaches reduction of $NO_x$ emissions from a two stage combustion process wherein in the first stage fuel is burned with less than about 75 to 80 percent stoichiometry air producing combustion gases at temperatures less than 2700° F., the temperature above which significant amounts of $NO_x$ are produced. The product of the first combustion stage, plus air to support low temperature combustion is passed to a second stage for complete combustion in a specially cooled system so that combustion is carried out at a low temperature, less than that at which $NO_x$ is produced. U.S. Pat. No. 4,505,666 teaches staged two zone combustion for low $NO_x$ emissions wherein about 80 to 95 percent of the combustion air and about 40 to 60 percent of the fuel is supplied to a first combustion zone in a fuel lean mixture and the products of the first combustion zone are supplied to the second combustion zone together with 5 to 20 percent of the air and 40 to 60 percent of the fuel in a fuel-rich mixture. U.S. Pat. No. 4,054,407 teaches a staged catalytic combustion wherein a first stage fuel-rich/air mixture of about 0.2 to 0.5 stoichiometry is combusted in the presence of a catalyst to maintain a low temperature of about 1000° to 1500° F. and a second stage combusts the gaseous products of the first stage with the addition of air to at least stoichiometric amounts, with excess air being used to retain a low temperature. U.S. Pat. No. 3,914,091 teaches two stage catalytic combustion wherein a first stage is carried out under fuel-rich conditions with less than 70 percent stoichiometric air in the presence of a nickel catalyst and a second stage combustion of the product gases of the first stage with additional air to at least stoichiometric amounts is effected to result in low $NO_x$ emissions. Other patents relating to staged combustion processes are U.S. Pat. Nos. 4,405,587; 4,488,866 and 4,403,941.

Regenerative furnaces are widely used in industry, such as in the glass making industry. In regenerative furnaces, combustion oxidizer, typically air or oxygen enriched air is passed through a high temperature regenerator constructed with a thermal energy storage material, such as special shaped refractory brick, called checkers, and is preheated by thermal transfer from the regenerator checkers which previously have been heated by thermal transfer from high temperature furnace exhaust gases. Oxidizer preheating increases flame temperature, enhances heat transfer to the furnace load, increases furnace productivity and improves furnace thermal efficiency. Conventionally, flow of exhaust gases to heat regenerator checkers and flow of oxidizer to be heated by alternate regenerator checkers are switched from one regenerator to the other every 15-20 minutes (cycle time). During such switching period called reversal, the fuel flow is stopped to purge exhaust gases from one regenerator during which the oxidizer cools down the load, furnace, and regenerators until the new fuel and oxidizer flows are established in another regenerator. The reversal amounts to about 3 to about 6 percent of the furnace cycle time and it adversely affects furnace productivity, furnace thermal eficiency, and furnace service life.

SUMMARY OF THE INVENTION

It is an object of this invention to provide a combustion process and apparatus for increasing industrial furnace productivity and increasing overall furnace thermal efficiency.

It is another object of this invention to provide combustion of hydrocarbon fuels in a controllable, highly luminous, high temperature and high kinetic energy flame.

It is still another object of this invention to provide highly efficient thermal transfer from a flame to the load of a furnace.

It is yet another object of this invention to provide combustion of hydrocarbon fuels with reduced nitrogen oxide emission.

It is still another object of this invention to provide highly efficient oxygen enriched combustion of hydrocarbon fuels.

It is yet another object of this invention to provide continuous operation of a fuel cracking chamber and fuel cracking system in conjunction with cyclic regenerative heating of oxidizer.

This invention provides improved oxygen enriched combustion which increases flame luminosity, temperature, and kinetic energy, thereby increasing heat transfer to the load, increasing furnace productivity, and improving furnace thermal efficiency. The improved combustion of this invention reduces the adverse effects of cycling in regenerative furnaces and reduces $NO_x$ pollutant emissions.

The process according to this invention is carried out in two physically separated stages, a cracking stage and a combustion stage. A fuel cracking chamber is fed about 5 to about 40 percent of the total fuel to be combusted and cracked. The cracking chamber is operated under fuel-rich conditions with oxygen-rich gas. The oxygen-rich gas is fed to the cracking chamber in an amount of about 5 to about 50 percent of the stoichiometric requirement for complete oxidation of the fuel fed to the cracking chamber and is in a form comprising greater than about 30 volume percent oxygen. Cracking is carried out in the cracking chamber at below about 2200° F. producing a cracked products mixture. The cracked products mixture comprises uncracked fuel, carbon monoxide, hydrogen, carbon dioxide, water, soot and some inerts. The cracked products mixture is passed to a combustion chamber and the remainder of fresh fuel and sufficient oxidizer for substantially complete combustion of all of the fuel is supplied to and combusted in the combustion chamber generating a controllable, high luminosity, high temperature and high kinetic energy flame. Combustion according to this invention is suitable for a wide variety of industrial furnaces, such as regenerative glass melting furnaces.

This invention is carried out with continuous operation of a fuel cracking chamber when the cracked products mixture is passed to a combustion chamber of the type operating with cyclic regenerative heating of oxidizer. It is important that the fuel cracking chamber be continuously operated since start-up of a cracking chamber, even after a short shutdown, requires as much or more time than the shutdown period to obtain stable operation. These shutdowns reduce overall cracking chamber, combustion chamber, and load temperatures and adversely affect furnace productivity and furnace thermal efficiency. This invention provides continuous, more efficient operation of the fuel cracking chamber. In addition, this invention provides combustion of the cracked products mixture and of the directly fed fuel in the combustion chamber generating a high temperature, luminous, high kinetic energy flame resulting in enhanced heat transfer to the furnace load during the reversal of regenerators. During the reversal about 25 to about 100 percent of the normal fuel flow and about 25 to about 100 percent of the normal oxygen-rich gas flow is maintained to the cracking chamber with about 25 to about 100 percent of the normal cracked products flow and about 25 to about 100 percent of the normal fresh fuel flow maintained and combusted with sufficient oxidizer providing stable cracking chamber operation and at least an auxiliary reversal combustion flame during the regenerator reversal. Continuous operation of the fuel cracking chamber and continuous combustion of the cracked products mixture in the combustion chamber also reduces undesired cooling of the combustion chamber, its load, and regenerators, further increasing furnace productivity and furnace thermal efficiency.

BRIEF DESCRIPTION OF THE DRAWING

The above objects and additional advantages of this invention will be observed in reading the following preferred embodiments with reference to the drawing wherein.

DESCRIPTION OF THE PREFERRED EMBODIMENTS

Figure 1:
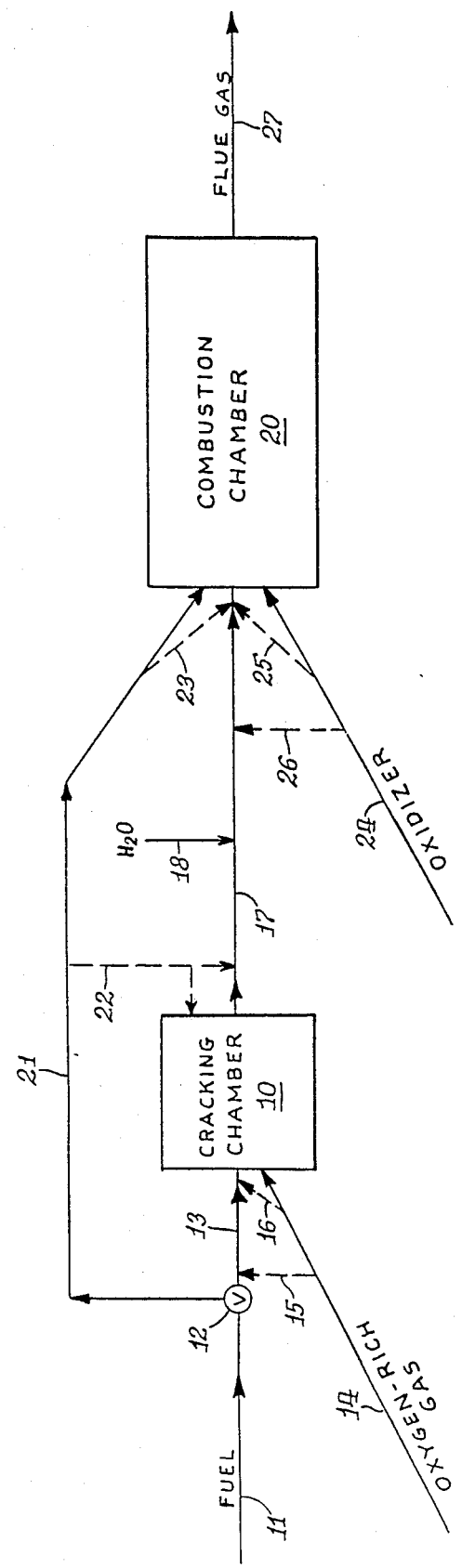
FIG. 1 is a highly stylized, simplifed, flow diagram illustrating one embodiment of an apparatus for conduct of the process according to this invention.

Hydrocarbon fuels for use in the combustion of this invention include fossil derived and synthetic fuels. Gaseous, liquid, vaporized liquid, pulverized solid, and solid/liquid mixture fuels may be used. Preferred hydrocarbon fuels include natural gas, synthetic natural gas (SNG), propane, and other mixtures comprising low molecular weight hydrocarbonaceous materials, such as methane. The fuel may comprise additives known to the art for specific purposes. The fuel may be preheated by any means known to the art including, preferably, by thermal transfer from exhaust gases from one or both of the cracking and combustion chambers or from the flue gases. It is preferred that the fuel be preheated to temperatures of about 500° to 1500° F., most preferably about 700° to 1200° F., prior to introduction to either or both of the cracking and combustion chambers. The fuel may be introduced into the cracking and combustion chambers through any suitable nozzle as known to the art for enhancing reaction within the chambers. About 5 to about 40 percent of the total fuel to be combusted and cracked is introduced to the cracking chamber with about 60 to about 95 percent of the fuel to be burned introduced as fresh fuel to the combustion chamber. In preferred embodiments, about 20 to about 40 percent of the total fuel to be combusted and cracked is introduced into the cracking chamber and about 60 to about 80 percent of the fresh fuel is introduced directly to the combustion chamber. The fuel supply conduit may be appropriately valved upstream from the cracking chamber to provide adjustable and controlled bypass of fresh fuel to the combustion chamber.

"Oxygen-rich gas" as used throughout this disclosure and claims refers to gas having higher oxygen content than air and includes up to 100 percent oxygen. Oxygen-rich gas comprising greater than about 30 volume percent oxygen, preferably about 70 to 100 volume percent oxygen is supplied to the cracking chamber for sub-stoichiometric combustion of a portion of the fuel in the cracking chamber. Commercially available "industrial" oxygen is in the order of 75 volume percent and higher oxygen and is satisfactory for use in this invention. The oxygen-rich gas is supplied to the cracking chamber in an amount of about 5 to about 50 percent of the stoichiometric requirement for complete combustion, about 10 to about 20 percent of the stoichiometric requirement being preferred. The oxygen-rich gas may be preheated to about 600° to about 1000° F. by any suitable thermal transfer means, most preferably utilizing thermal energy in the exhaust gases exiting the cracking and/or combustion chambers. The oxygen-rich gas may be introduced to the cracking chamber by introduction to the fuel conduit and mixing with the fuel therein, by introduction to the fuel nozzle and mixed with the fuel therein for injection into the cracking chamber, or the oxygen-rich gas may be separately introduced to the cracking chamber.

Sub-stoichiometric combustion of a portion of the 5 to about 50 percent of the fuel introduced to the cracking chamber is conducted to obtain a temperature below about 2200° F., preferably about 1400° to about 2200° F. and most preferably about 1600° to about 1800° F. The temperature is maintained or adjusted by the amount of oxygen-rich gas fed to the cracking chamber. Fuel cracking in the cracking chamber under the above conditions results in cracked products mixture comprising uncracked fuel, carbon monoxide, hydrogen, carbon dioxide, water, soot and inerts.

The cracked products mixture is passed to the combustion chamber. It is desirable to cool the cracked products mixture to below about 800° F., preferably to about 500° to about 700° F. prior to its introduction into the combustion chamber. Cooling is desirable to freeze or stabilize the cracked products mixture and to avoid oxidation of soot; to provide reliable combustion control; to provide reliable burner operation, and to reduce thermal losses in the fuel distribution pipeline. Cooling may be achieved by passing the cracked products mixture in a final stage of the cracking chamber or exiting the cracking chamber over a heat exchanger, adding water or steam to the mixture, or by mixing with some or all the oxidizer and/or remainder of the fresh fuel. Steam, fresh fuel and/or oxidizer may be added to the cracked products mixture prior to introduction to a nozzle feeding into to the combustion chamber. Alternatively, all or any part of any of the steam, the fresh fuel, and/or the oxidizer may be introduced to a nozzle injecting the cracked products mixture or may be introduced to the exit of such nozzle, or may be introduced separately directly to the combustion chamber and mixed with the cracked products mixture therein. The oxidizer introduced to the combustion chamber comprises sufficient oxygen for substantially complete combustion of all of the fuel in the combustion chamber. The process of this invention provides substantially complete combustion with reduced amounts of excess air. The oxidizer may comprise atmospheric air alone, oxygen enriched atmospheric air having any amount of oxygen in excess to that of atmospheric air and up to 100 percent, including gas such as "industrial" oxygen or other gases comprising about 70 to about 100 percent oxygen. The oxidizer or a portion of it may preferably be preheated to about 600° to 2500° F., by any known thermal transfer means, preferably utilizing the thermal energy in the exhaust gases exiting the cracking and/or combustion chambers.

Combustion in the combustion chamber produces a controllable length and shape of the flame generating high luminosity, high temperature, and a high kinetic energy flame. Typically high luminous flames result in about $1.5 \times 10^{-4}$ pounds of soot or solids per Standard Cubic Foot of the combustion products. The process of this invention generates flames resulting in soot or solids in an amount about 2.0 to about $3.0 \times 10^{-4}$ lb/SCF. This highly efficient combustion results in an increased heat transfer to the furnace load. The increases in both combustion efficiency and thermal transfer to the load provide increased furnace specific production rate and reduced specific fuel consumption. Depending upon the type of combustion chamber, the flame temperature in the process of this invention may be up to about 4000° F. and higher. The process of this invention also reduces furnace $NO_x$ emission due to increased specific production rate, reduced specific fuel consumption, greater ability to control flame length and shape, and reduced peak flame temperature.

FIG. 1 shows fuel supply conduit 11 from any suitable supply source, not shown. Fuel valve 12 controls the amount of fuel fed to fuel cracking chamber 10 through fuel supply conduit 13 and the amount of fuel which bypasses the cracking chamber and passes as fresh fuel through fuel supply conduit 21 to combustion chamber 20. Oxygen-rich gas may be supplied by any suitable source, not shown, through oxygen-rich gas supply conduit 14 which may be fed directly into cracking chamber 10 or, as shown by the dashed lines, by conduit 16 to the fuel nozzle or by conduit 15 to fuel supply conduit 13. The oxygen-rich gas may be supplied to cracking chamber 10 by any single or combination of these means of introduction of oxygen-rich gas for mixing with the fuel for sub-stoichiometric combustion of a portion of the fuel fed to cracking chamber 10. Sub-stoichiometric combustion as carried out in cracking chamber 10 produces elevated temperatures of below about 2200° F. and cracks a substantial amount of the excess hydrocarbon fuel to a lower molecular weight fuel and forms considerable amount of carbon black solids or soot, about 0.05 to about 0.2 pound per pound of fuel. The mixture of cracked products is passed through cracked products mixture conduit 17 to combustion chamber 20. The cracked products mixture is preferably cooled at the cracking chamber exit by introduction of water or steam through conduit 18 or by any other suitable heat exchanger. Fresh fuel may be added to the exit end of cracking chamber 10 and/or to cracked products mixture conduit 17 through fresh fuel conduit 22, and/or may be added through conduit 23 to a nozzle leading into combustion chamber 20, and/or may be fed directly from fresh fuel supply conduit 21 separately into combustion chamber 20. Oxidizer is supplied through oxidizer conduit 24 from any suitable source, not shown. Oxidizer may be supplied through oxidizer conduit 26 to mix with cracked products mixture in conduit 17 and/or may be supplied through oxidizer conduit 25 to a nozzle leading into combustion chamber 20 and/or may be supplied separately to cmbustion chamber 20. High temperature combustion with high heat transfer to the furnace load may be conducted in primary combustion chamber 20 using arrangements of various types of burners as known to the art to be suitable for the particular process desired and exhaust gases exit through conduit 27. It should be readily apparent that while simplified FIG. 1 shows introduction of cracked products mixture, fresh fuel, and oxidizer in association with a single burner or port, that each of these conduits may be fed as desired to multiple burners and multiple ports as required by the process for which the combustion system is used. Likewise, it should be readily apparent that a single cracking chamber 10 or multiple cracking chambers 10 may be used in accordance with this invention. Control means for conduct of the desired flows as shown in FIG. 1, should be readily apparent to one skilled in the art.

When using a cracking chamber according to this invention to produce a cracked products mixture for combustion in a combustion chamber which is operated in a regenerative mode, it is important that the cracking chamber be continuously operated. Regenerative furnaces are conventionally used in industry, such as in the glass industry, wherein the exhaust gases from the furnace are passed through one regenerator to transfer a portion of its heat content to the checkers while combustion air and/or fuel are preheated in a alternate regenerator by transfer of heat from checkers. Shutdown of the cracking chamber for as short a period as 30 to 60 seconds during the reversal results in interruption of production of stable cracked products mixture for about 90 to 120 seconds, adding to the effective shutdown periods conventional for operation of regenerative combustion chambers. According to the process of this invention, both the cracking chamber and the combustion chamber are maintained in operation during the reversal. This continuous cracking of fuel and continuous regenerative furnace operation in addition to providing stabilized cracking chamber and combustion chamber operation, increasing effective operating time of a cracking chamber by about 8 to about 14 percent and of the combustion chamber by about 3 to about 6 percent, increasing furnace productivity and furnace thermal efficiency, reduces thermal cycling damage to both the cracking chamber and the combustion chamber. In accordance with this invention, as shown in FIGS. 2A-2D and 3B-3F, continuous production of cracked products mixture and continuous feed of this mixture to the combustion chamber is achieved with substantially continuous combustion in the combustion chamber itself. Fuel flow and oxygen-rich gas flow may be reduced during the regenerator reversals, the fuel flow and oxygen-rich gas flow to the cracking chamber being maintained at about 25 to about 100 percent of its normal flow and preferably from about 45 to about 85 percent of its normal flow during regenerator reversals and the fuel fed directly to the combustion chamber may be reduced to and maintained at about 25 to about 100 percent of its normal flow and preferably from about 45 to about 85 percent of its normal flow during the regenerator reversals. It has been found that satisfactory combustion may be maintained in the combustion chamber with the cracked products mixture in combination with fuel fed directly to the combustion chamber and oxidizer comprising necessary concentration and sufficient amount of oxygen for substantially complete combustion in the regenerative combustion chamber. Thus, satisfactory reduced or full operation of the cracking chamber and reduced or full operation of the regenerative combustion chamber may be maintained throughout regenerator reversals.

Figure 2A:
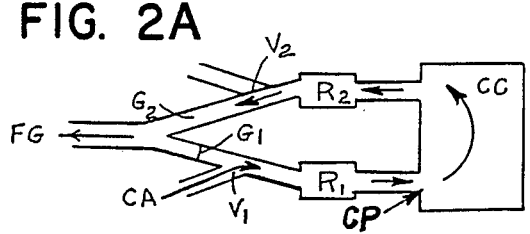
FIGS. 2A-2D are highly stylized, simplified, flow diagrams illustrating one embodiment of gas flow during a regenerator reversal according to this invention.
Figure 2B:
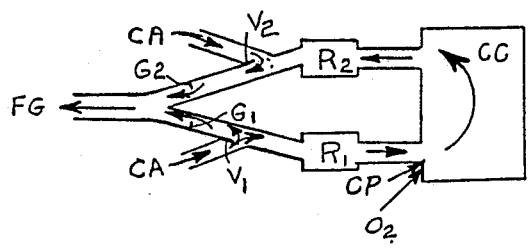
Figure 2C:
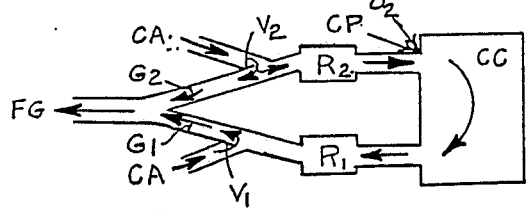
Figure 2D:
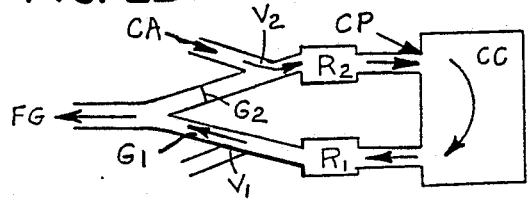

Any means of providing continuous production of cracked products mixture, continuous flow of the fuel fed directly to the combustion chamber, and continuous flow of oxidizer comprising necessary concentration and sufficient amount of oxygen for substantially complete combustion in the regenerative combustion chamber may be used. Likewise, various sequences of switching from one regenerator to another regenerator may be used with various valving and gating, provided that substantially continuous combustion of the cracked products is maintained in the regenerative combustion chamber. FIGS. 2A-2D illustrate one of the embodiments of the practice of operation of this invention. FIG. 2A shows all of the combustion air (CA) passing through regenerator ($R_1$) for preheating and entry into combustion chamber (CC) with cracked products/fresh fuel mixture (CP) being fed to the combustion chamber in the same region as combustion air which has passed through regenerator ($R_1$). Substantially complete combustion takes place in the combustion chamber (CC) with exhaust gases passing through and preheating regenerator ($R_2$) and flue gases (FG) passing outwardly through a flue gas conduit. The flow of combustion air to regenerator ($R_1$) is controlled by valve ($V_1$), shown open in FIG. 2A, and by valve ($V_2$) shown closed in FIG. 2A. The flow of flue gases is controlled by gate ($G_1$) shown closed in FIG. 2A and gate ($G_2$) shown open in FIG. 2A. As shown in FIG. 2A, combustion air is being preheated by regenerator ($R_1$) and exhaust gases are preheating regenerator ($R_2$). At the beginning of the regenerator reversal, as shown in FIG. 2B, gates ($G_1$) and ($G_2$) and valves ($V_1$) and ($V_2$) may each be partially open with additional oxidizer ($O_2$) comprising sufficient oxygen for substantially complete combustion being added with the cracked products/fresh fuel mixture (CP). Under the conditions shown in FIG. 2B, combustion is still taking place near the inlet to the combustion chamber from regenerator ($R_1$) with flue gases passing through regenerator ($R_2$). FIG. 2C shows reversal of flow of flue gases and combustion reversal to the area of inlet from regenerator ($R_2$). Following this reversal of direction of flue gas flow, gate ($G_2$) is fully closed while gate ($G_1$) is fully opened and valve ($V_1$) is fully closed, while valve ($V_2$) is fully opened, providing flow of combustion air (CA) through regenerator ($R_2$) and into the combustion chamber (CC) with cracked products/fresh fuel mixture (CP) being added near the combustion chamber inlet from regenerator ($R_2$) and passage of flue gases through regenerator ($R_1$) to preheat that regenerator, thereby completing the regenerator reversal, while providing substantially continuous operation of the cracking chamber.

Figure 3B:
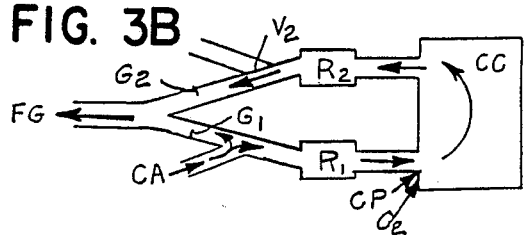
FIGS. 3B-3F are highly stylized, simplified, flow diagrams illustrating another embodiment of gas flow during a regenerator reversal according to this invention.
Figure 3C:
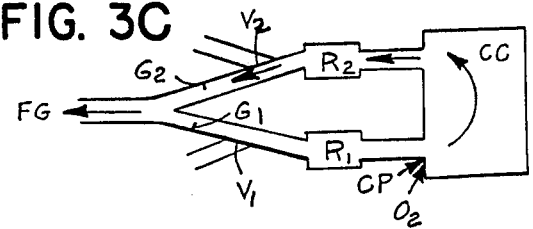
Figure 3D:
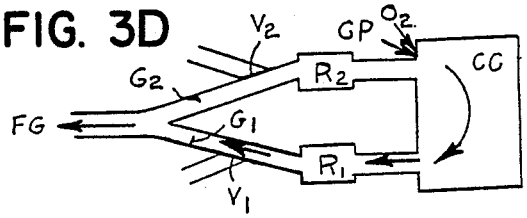
Figure 3E:
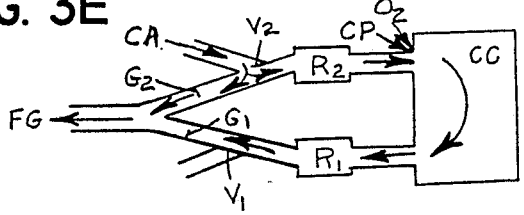
Figure 3F:
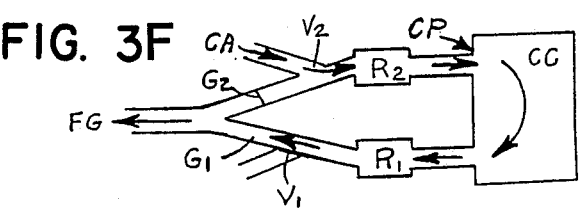

FIGS. 2A and 3B-3F show another embodiment of the practice of operation of this invention wherein to switch exhaust gas flow from regenerator ($R_2$) to regenerator ($R_1$) valve ($V_2$) is completely closed shutting off flow of combustion air (CA), while flue gas gates ($G_1$) and ($G_2$) are partially closed, as shown in FIG. 3B. Valve ($V_1$) is then fully closed shutting off combustion air (CA) and oxidizer ($O_2$) is provided in the proximity of entrance of cracked products/fresh fuel mixture (CP). In this embodiment, all of the oxidizer necessary for combustion is provided in association with the cracked products/fresh fuel mixture as shown in FIG. 3C and not passed through either regenerator. FIG. 3D shows reversal of combustion from the area of the inlet from regenerator ($R_1$) to the inlet from regenerator ($R_2$). Valve ($V_2$) allowing entry of combustion air (CA) is then opened as shown in FIG. 3E and flue gas gate ($G_1$) is fully opened, while flue gas gate ($G_2$) is fully closed, thus providing switching of exhaust gas flow from regenerator ($R_2$) to regenerator ($R_1$) with continuous production of cracked products mixture and its combustion in the combustion chamber. It should be apparent to one skilled in the art that other slight modifications of the above described processes may be used to achieve the objects of this invention providing continuous production of cracked products mixture in the cracking chamber during regenerator reversals.

Sizing and operation of valves such as ($V_1$) and ($V_2$) and gates such as ($G_1$) and ($G_2$) to accomplish the desired flow according to this invention should be apparent to one of ordinary skill in the art, as well as suitable control systems for operation of these valves, gates and cracked products and oxidizer flows in accordance with this invention. The specific means of valving or such control are not a part of this invention.

This invention provides advantageous use of cracked products mixture obtained from a continuously operating cracking chamber in regenerative-type combustion chambers resulting in substantially continuous combustion in the regenerative combustion chamber. Such substantially continuous operation of the cracking chamber with substantially continuous combustion in the regenerative combustion chamber provides about 8 to about 14 percent increase in operative cracking chamber time, about 3 to about 6 percent increase in operative regenerative furnace time and reduces costly cracking chamber and furnace repairs necessitated by thermal cycling of these chambers.

The combustion process and apparatus of this invention may advantageously be used in glass melting furnaces, such as a regenerative end port glass furnace which has a single entrance port and a single exit port and a regenerative sideport glass furnace which has multiple entrance ports and multiple exit ports. Both types of furnaces are equipped with regenerators to provide high efficiency heat recovery.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for combustion of hydrocarbon fuel in a continuous regenerative furnace comprising:
    combusting and cracking a first portion of said fuel with oxygen-rich gas in an amount less than stoichiometric requirement for complete combustion of said first portion in a cracking chamber producing a cracked products mixture;
    introducing fluid flow in a first direction into a combustion chamber, said fluid flow comprising said cracked products mixture and a second remaining portion of said fuel and oxidizer comprising sufficient oxygen for substantially complete combustion of all said fuel in said combustion chamber;
    passing an exhaust gas flow through a first regenerator;
    reversing said fluid flow in a second direction through said combustion chamber, said second direction being different from said first direction;
    passing said exhaust gas flow through a second regenerator; and
    conducting said combustion and cracking in said cracking chamber and said combustion in said combustion chamber substantially continuously throughout reversals of said fluid flow through said combustion chamber.

2. A process according to claim 1 wherein said first portion of said fuel is maintained during said reversals at about 25 to about 100 percent of its normal flow.

3. A process according to claim 1 wherein said second remaining portion of said fuel is maintained during said reversals at about 25 to about 100 percent of its normal flow.

4. A process according to claim 1 wherein said first portion of said fuel is maintained during said reversals at about 25 to about 100 percent of its normal flow and said second remaining portion of said fuel is maintained during said reverals at about 25 to about 100 percent of its normal flow.

5. A process according to claim 1 wherein said first portion of said fuel is maintained during said reversals at about 45 to about 85 percent of its normal flow.

6. A process according to claim 1 wherein said second remaining portion of said fuel is maintained during said reversals at about 45 to about 85 percent of its normal flow.

7. A process according to claim 1 wherein said first portion of said fuel is maintained during said reversals at about 45 to about 85 percent of its normal flow and said second remaining portion of said fuel is maintained during said reversals at about 45 to about 85 percent of its normal flow.

8. A process according to claim 1 wherein said introducing of said cracked products mixture to said combustion chamber is maintained during said reversals at about 25 to about 100 percent of its normal flow.

9. A process according to claim 1 wherein said introducing of said cracked products mixture to said combustion chamber is maintained during said reversals at about 45 to about 85 percent of its normal flow.

10. A process according to claim 1 wherein said first portion of said fuel is maintained during said reversals at about 25 to about 100 percent of its normal flow, said second remaining portion of said fuel is maintained during said reversals at about 25 to about 100 percent of its normal flow, and said introducing of said cracked products mixture to said combustion chamber is maintained during said reversals at about 25 to about 100 percent of its normal flow.

11. A process according to claim 1 wherein said first portion of said fuel is maintained during said reversals at about 45 to about 85 percent of its normal flow, said second remaining portion of said fuel is maintained during said reversal at about 45 to about 85 percent of its normal flow, and said introducing of said cracked products mixture to said combustion chamber is maintained during said reversals at about 45 to about 85 percent of its normal flow.

12. A process according to claim 1 wherein said first portion is about 5 to about 40 percent of all said fuel to be cracked and combusted and said oxygen-rich gas is introduced to said cracking chamber in an amount of about 5 to about 50 percent of said stoichiometric requirement for complete combustion of said first portion, said second remaining portion is about 60 to about 95 percent of all said fuel, said cracking chamber at a temperature below about 2200° F., and said oxygen-rich gas comprises greater than about 30 volume percent oxygen.

13. A process according to claim 12 wherein said first portion is about 20 to about 40 percent of all said fuel and said second remaining portion is about 60 to about 80 percent of all said fuel.

14. A process according to claim 12 wherein said cracked products mixture is cooled to below 800° F. prior to introducing to said combustion chamber.

15. A process according to claim 12 wherein said oxidizer is preheated to about 600° to about 2500° F.

16. A process for continuously operating a hydrocarbon fuel cracking chamber during reversals of exhaust gas flow from a continuous regenerative furnace and for combustion in a regenerative furnace combustion chamber which is continuously fed with cracked products mixture and fresh fuel, said process comprising the steps:
- partially closing a first valve reducing supply of first oxidizer to a first regenerator;
- supplying said cracked products mixture, said fresh fuel and second oxidizer to a first region of entrance from said first regenerator to said combustion chamber;
- partially opening a first gate permitting flow of said first oxidizer to said first regenerator to a flue;
- partially closing a second gate restricting flow of flue gases from a second regenerator;
- partially opening a second valve permitting flow of said first oxidizer to said second regenerator to a flue;
- switching supply of said cracked products mixture, said fresh fuel and said second oxidizer from said first region of entrance from said first regenerator to a second region of entrance from said second regenerator to said combustion chamber;
- fully opening said first gate and closing said second gate permitting flow of flue gases only from said first regenerator to said flue;
- fully closing said first valve and fully opening said second valve permitting supply of said first oxidizer only to said second regenerator; and
- discontinuing supply of said second oxidizer, all while providing continuous combustion of said cracked products mixture and fresh fuel in said combustion chamber during said reversal of exhaust gas flow from said second to said first regenerator.

17. A process according to claim 16 wherein said cracked products mixture supply is maintained during said reversals at about 25 to about 100 percent of its normal flow.

18. A process according to claim 16 wherein said cracked products mixture supply is maintained during said reversals at about 45 to about 85 percent of its normal flow.

19. A process according to claim 16 wherein said fresh fuel supply is maintained during said reversals at about 25 to about 100 percent of its normal flow.

20. A process according to claim 16 wherein said fresh fuel supply is maintained during said reversals at about 45 to about 85 percent of its normal flow.

* * * * *